US012565334B2

(12) United States Patent
Chacin et al.

(10) Patent No.: US 12,565,334 B2
(45) Date of Patent: Mar. 3, 2026

(54) MACHINING SYSTEM

(71) Applicants: Airbus Operations Limited, Bristol (GB); University of Sheffield, Sheffield (GB)

(72) Inventors: Marco Chacin, Bristol (GB); Navein Madhavan, Bristol (GB); Yuri Mejia Melgarejo, Bristol (GB); Ashutosh Tiwari, Bristol (GB)

(73) Assignees: Airbus Operations Limited, Filton (GB); The University of Sheffield, Sheffield (GB)

( * ) Notice: Subject to any disclaimer, the term of this patent is extended or adjusted under 35 U.S.C. 154(b) by 0 days.

(21) Appl. No.: 19/062,455

(22) Filed: Feb. 25, 2025

(65) Prior Publication Data

US 2025/0276810 A1 Sep. 4, 2025

(30) Foreign Application Priority Data

Feb. 29, 2024 (GB) ...................................... 2402915

(51) Int. Cl.
B25J 11/00 (2006.01)
B25J 9/16 (2006.01)
B64F 5/10 (2017.01)
(52) U.S. Cl.
CPC ................. B64F 5/10 (2017.01); B25J 9/163 (2013.01); B25J 11/005 (2013.01)
(58) Field of Classification Search
CPC .................................. B64F 5/10; B25J 11/005
See application file for complete search history.

(56) References Cited

U.S. PATENT DOCUMENTS

| | | | |
|---|---|---|---|
| 11,243,507 B2 * | 2/2022 | Garvey | .............. G05B 19/4183 |
| 2004/0256152 A1 | 12/2004 | Dashevskiy | |
| 2018/0174067 A1 * | 6/2018 | Spiro | ..................... G06F 30/20 |
| 2022/0205351 A1 | 6/2022 | Srivastav | |

OTHER PUBLICATIONS

Extended European Search Report in EP Application No. 25160711. 5, dated Mar. 25, 2025, 10 pages.

(Continued)

*Primary Examiner* — Jason L Vaughan
*Assistant Examiner* — Amanda Kreiling
(74) *Attorney, Agent, or Firm* — KDW Firm PLLC

(57) ABSTRACT

A machining system includes an automated manipulator configurable between a measuring configuration, in which a position probe is operable, and a machining configuration, in which a tool is operable, a fixture for holding a template or a workpiece, and a controller. The controller is configured cause the automated manipulator, in the measuring configuration, to move the position probe to at least one reference feature of the template held in the fixture, to determine coordinate data associated with the at least one reference feature. Then, the controller provides the determined coordinate data to a machine learning agent which is trained to provide an estimate of machining coordinate deviation based on the determined coordinate data. If the estimated machining coordinate deviation is below a threshold coordinate deviation, the automated manipulator is allowed to proceed to machine a workpiece.

22 Claims, 3 Drawing Sheets

(56) References Cited

OTHER PUBLICATIONS

Monostori et al., "Machine Learning Approaches to Manufacturing," Annals of the CIRP, vol. 45, No. 2: 675-712 (Sep. 2018).
Ramesh et al., "Error Compensation in Machine Tools—A Review Part II; Thermal Errors," International Journal of Machine Tools and Manufacture, pp. 1257-1284 (Jul. 2000).
United Kingdom Intellectual Property Office Combined Search and Examination Report for GB Application No. 2402915.9, dated Jan. 17, 2025, 11 pages.

* cited by examiner

400

MACHINING SYSTEM

TECHNICAL FIELD

The disclosure herein concerns machining using a machining system. More particularly, but not exclusively, the disclosure herein concerns a machining system comprising an automated manipulator configurable between a measuring configuration, in which a position probe is operable, and a machining configuration, in which a tool is operable. The disclosure herein also concerns a method of machining using a machining system comprising such an automated manipulator. The disclosure herein also concerns a method of training a machine learning agent for estimating a machining accuracy of a machining process.

In the disclosure herein, a machine learning agent is used to predict whether the accuracy of a downstream machining process would be sufficient to allow the machining process to continue.

BACKGROUND

Machine learning is sometimes used to analyze and provide predictions, particularly in some simulation processes or lab-based settings. However, machine learning techniques have not been applied fully in the context of high-accuracy manufacturing processes, such as high-accuracy drilling, for example. In particular, the use of machine learning techniques for assisting with high accuracy drilling on an industrial scale is not known.

The disclosure herein seeks to provide predictive capability to a machining process and machining system through the use of a machine learning agent.

SUMMARY

The disclosure herein provides, according to a first aspect, a machining system. The machining system comprises an automated manipulator configurable between a measuring configuration, in which a position probe is operable, and a machining configuration, in which a tool is operable. The machining system further comprises a fixture for holding a template or a workpiece and a controller. The controller is configured to cause the automated manipulator, in the measuring configuration, to move the position probe to at least one reference feature of the template held in the fixture, to determine coordinate data associated with the at least one reference feature. The controller then provides the determined coordinate data to a machine learning agent. The machine learning agent is trained to provide an estimated machining coordinate deviation based on the determined coordinate data. In response to the estimated machining coordinate deviation being below a threshold coordinate deviation, the controller causes the automated manipulator to proceed in the machining configuration.

One advantage of embodiments of the disclosure herein is that prior to the automated manipulator proceeding in the machining configuration, in which a workpiece is committed to being machined, a decision is made as to whether the onwards machining coordinate deviation, which is indicative of machining accuracy, is likely to be acceptable, i.e. sufficiently small, to proceed with machining the workpiece. This decision is based on the machining coordinate deviation predicted by the machine learning agent and assessing whether it falls below a threshold coordinate deviation.

Machining coordinate deviation should be understood to mean the discrepancy between nominal machining coordinates (e.g. in X and Y cartesian coordinates) and actual machining coordinates. Discrepancies can arise due to drifts in calibration influenced by factors such as temperature, wear and tear or variations within the components of the automated manipulator and/or the fixture, for example. Ideally, such coordinate deviations would be zero. In practice, they are unlikely to be zero, but for a given machining process there will usually be an upper limit, above which the deviations would be deemed too large to be acceptable. Hence, a threshold coordinate deviation is defined, above which the machining process should not proceed and below which the machining process is allowed to proceed.

In embodiments, in the machining configuration the controller is configured to cause the automated manipulator to return to the position of the at least one reference feature and machine, using the tool, the workpiece held in the fixture. The positions machined correspond to the coordinate data measured by the position probe when the template is mounted on the fixture of the machining system. In other words, the automated manipulator repeats the measured feature positions but with the tool attached as opposed to the position probe being attached. This exploits the repeatability of the automated manipulator, which is its capability to return to the measured template positions. However, it should be appreciated that once the predicted machining accuracy has been determined to be sufficient for machining to proceed, the automated manipulator may, in embodiments, machine locations other than, or in addition to, those corresponding to the coordinate data measured by the position probe when the template was mounted on the fixture of the machining system, such as positions based on CAD data, for example.

In embodiments, in response to the estimated machining coordinate deviation being above the threshold coordinate deviation, the controller does not cause the automated manipulator to proceed in the machining configuration. In this manner, if it is decided that the downstream machining accuracy is not likely to be sufficient, the machining process is halted or aborted. This has the advantage of reducing or eliminating scrappage. Otherwise, to continue with the machining process when the predicted machining accuracy falls below a required accuracy could result in the resultant, machined workpiece falling outside of specified tolerances. This could render the workpiece unusable, which would constitute a waste of resources in terms of machine time and money.

In embodiments, in response to the estimated machining coordinate deviation being above the threshold coordinate deviation, the controller is further configured to provide an alert to an operator of the machining system that the estimated machining accuracy is not sufficient to proceed with machining the workpiece. This brings to the attention of the operator that steps may need to be taken in order to bring the machining system into a fit and proper state to continue with workpiece machining. This could, for example, involve recalibrating some part of the machining system. Optionally, the alert comprises a hypothesis of a cause for the estimated machining coordinate deviation being above threshold. This could assist an operator in fault-finding the machining system or deciding which component or aspect of the machining system requires intervention in order to bring the machining accuracy back within the desired tolerance.

In embodiments, the machining system further comprises one or more sensors configured to sense parameters of the machining system. These parameters could be temperature of the machining system or a force present within the machining system, for example. The controller reads parameter value(s) from the sensor(s) and provides the reading(s) to the machine learning agent. The estimated machining coordinate deviation provided by the machine learning agent is therefore, in such embodiments, further based on the parameter value(s), in addition to the coordinate data mentioned above. In this manner, the accuracy or trustworthiness of the prediction provided by the machine learning agent may be improved. This is because the machine learning agent is provided with additional information about factors which may influence the machining coordinate deviation of the machining system. It should be understood that by "accuracy of the prediction provided by the machine learning agent" it is meant the extent to which the prediction of machining coordinate deviation provided by the machine learning agent matches the real-world, actual machining coordinate deviation that would be obtained were the machining process be allowed to continue.

In embodiments, the machining system further comprises a memory for storing historical operational data associated with the machining system. By "historical" it is meant operational data from previous machining operations on prior workpieces. These could be hours, days, weeks, months or years before the present machining operation, for example. The operational parameters may include previous coordinate data and/or previous sensor(s) values(s) as discussed above. The controller reads the historical operational data from the memory and provides the historical operational data to the machine learning agent, which then provides an estimate of the machining coordinate deviation further on the basis of the historical operational data. In this manner, the accuracy of the prediction provided by the machine learning agent may be improved. This is because the machine learning agent is provided with additional information about factors which may influence the machining coordinate deviation of the machining system over time.

In embodiments, the machining system further comprises a coordinate measurement machine (CMM). A CMM is an apparatus that can measure the positions of features on a workpiece or template using some form of contact or non-contact probing. The controller causes the CMM to measure the position of the or each feature of the workpiece machined by the automated manipulator. The controller then compares the CMM measured positions of the or each machined feature with respective nominal positions defined by the template. This comparison may be used as a validation step to validate that the machined workpiece does indeed fall within the desired tolerances. Additionally, or alternatively, the training of the machine learning agent may be updated (improved) based on the comparison. This is because each machining run on a workpiece provides additional data which can augment the training quality of the machine learning agent.

According to a second aspect of the disclosure herein there is also provided a method of machining. The method comprises first causing an automated manipulator of a machining system, in a measuring configuration, to move a position probe to at least one reference feature of a template held in a fixture of the machining system. Then determining, with the position probe, coordinate data associated with the at least one reference feature. Then providing the determined coordinate data to a machine learning agent, the machine learning agent being trained to provide an estimate of machining coordinate deviation based on the determined coordinate data. Then in response to the estimated machining coordinate deviation being below a threshold coordinate deviation, causing the automated manipulator to proceed in a machining configuration in which a tool is operable to machine a workpiece.

In embodiments of the second aspect, the method further comprises—in the machining configuration and on the basis of the determined coordinate data—causing the automated manipulator to return to the position of the at least one reference feature and machine, using the tool, a workpiece held in the fixture.

In embodiments of the second aspect, the method further comprises causing a CMM to measure the position of the or each feature of the workpiece machined by the automated manipulator. Then comparing the CMM measured positions of the or each machined feature with respective nominal positions defined by the template. Then updating the training of the machine learning agent on the basis of the comparison.

According to a third aspect of the disclosure herein there is also provided a method of training a machine learning agent for estimating a machining coordinate deviation of a machining process. The method comprises causing an automated manipulator of a machining system, in a measuring configuration, to move a position probe to at least one reference feature of a template held in a fixture of the machining system. Then, determining, with the position probe, coordinate data associated with the at least one reference feature. Then causing the automated manipulator, in a machining configuration and on the basis of the determined coordinate data, to return to the position of the at least one reference feature and machine, using a tool, a workpiece held in the fixture. Then measuring the position of the or each feature of the workpiece machined by the automated manipulator. Then comparing the measured positions of the or each machined feature with respective nominal positions defined by the template. Then updating the training of the machine learning agent on the basis of the comparison. In embodiments, the training of the machine learning agent may be updated on the basis of data from the temperature and/or force sensor.

According to a fourth aspect of the disclosure herein there is also provided a machining system comprising: an automated manipulator comprising a tool; a position sensing probe; a sensor configured to sense a parameter of the machining system; and a controller. The controller is configured to receive at least one of: position data from the position sensing probe, and parameter data from the sensor. The controller provides the received data to a machine learning algorithm, the machine learning algorithm being trained to provide an estimate of machining coordinate deviation based on the received data. In response to the estimated machining coordinate deviation being below a threshold coordinate deviation, the controller causes the automated manipulator to process a workpiece using the tool.

The sensor may comprise a temperature sensor and/or a force sensor. There may be multiple sensors.

According to a firth aspect of the disclosure herein, there is provided an aircraft comprising an aircraft structure machined by the machining system of the first aspect and/or according to the method of the second aspect. The aircraft structure may comprise all, or a component part of, a wing structure.

According to a sixth aspect of the disclosure herein, there is provided a computer program comprising a set of instructions, which, when the program is executed by a computer, cause the computer to carry out the method of the second aspect and/or the method of the third aspect.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1:
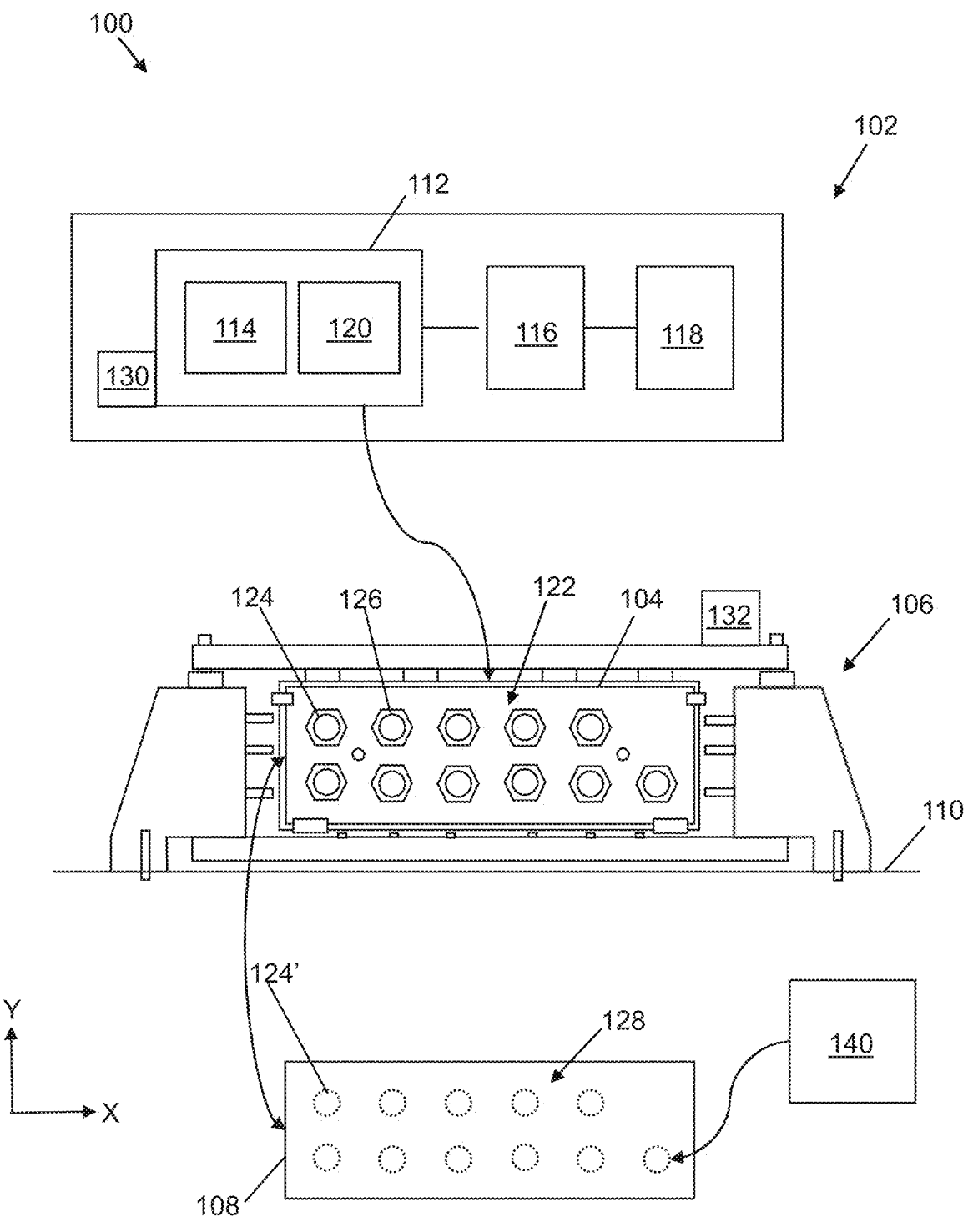
FIG. 1 shows a schematic view of a machining system comprising an automated manipulator according to embodiments of the disclosure herein.

FIG. 1 shows a schematic view of a machining system 100 according to embodiments of the disclosure. The machining system 100 comprises an automated manipulator 102, a template 104, a fixture 106 and a workpiece 108. The template 104 and the workpiece 108 may comprise a planar surface that is to be machined (for example, drilled) by the automated manipulator 102. The workpiece 108 may form part of a wing structure for an aircraft, for example.

The term "template" refers to something that supports the manufacturing process but does not form part of the manufactured product. An example of a manufactured product includes a vehicle structure, such as an aircraft structure (for example, a wing structure), and a vehicle (for example, an aircraft). In contrast, the term "workpiece" refers to something that forms part of the manufactured product. The workpiece is worked on, with support from the template, and may be assembled to other workpieces to form an assembly of workpieces. The template is a tool to assist the manufacture of the workpiece. The fixture 106 holds an orientation of at least one object, such as the template 104 or the workpiece 108. The fixture 106 is bolted to a workshop floor 110.

The automated manipulator 102 comprises a carrier/spindle 112, a position probe 114, a controller 116, and a memory 118. The controller 116 is configured to operate the carrier 112. Although not shown, the carrier 112 comprises an articulated arm and several joints to manipulate the articulated arm. The carrier 112 is configured to carry each of the position probe 114, and a tool 120, such as a drill. The probe 114 is unloaded when not required and the drill 120 is loaded in place of the probe 114. The process of switching between the probe 114 and drill 120 is performed automatically, although that process can be performed manually. The probe 114 is a touch-sensitive probe that indicates when the probe 114 contacts a surface. The carrier 112 is a multiple axis positioning system.

Such an automated manipulator 102, as described above, is sometimes referred to as an automation device or automation system, and may include, but is not limited to, robots, machine tools and parallel kinematic machines (PKMs), for example. The controller 116 can precisely control a position of the carrier 112 and thus the position of the probe 114 or drill 120 depending on the configuration of the automated manipulator 102.

The carrier 112, probe 114, controller 116, and memory 118 are electrically connected to each other to enable electrical signals to be transferred between each other and allow the automated manipulator 102 to internally communicate. The controller 116 determines coordinate data based on information received from probe 114. The position of the probe 114 comprises the positions of the articulated arm about the joints and the positions of the joints.

The template 104 comprises a reference hole pattern 122 formed by, in the illustrated example, eleven through-holes 124, 126. Once machined, the workpiece 108 comprises a matching hole pattern 128. The arrangement and number of the through-holes 124, 126 in the reference hole pattern 122 may vary, and eleven through-holes 124, 126 are shown by way of example. In practice, the through-holes 124, 126 will be scattered in a non-linear fashion and not arranged as a grid as shown in FIG. 1, and the number of through-holes 124, 126 will likely exceed one hundred, although that is dependent on the application of the respective workpiece 108.

The automated manipulator 102 is configurable between a first, measuring configuration, in which the probe 114 is operable, and a second, machining configuration, in which the drill 120 is operable. In the measuring configuration, the automated manipulator 102 collects information about the template 104, such as coordinate data of a multiplicity of points around an edge of each hole 124, 126. That coordinate data may be used to determine further coordinate data associated with a center of each hole. In the machining configuration, the automated manipulator 102 machines the workpiece 108 using the determined coordinate data collected by measuring the template 104.

In the measuring configuration, the automated manipulator 102 learns a location of each hole 124, 126 in the reference hole pattern 122 relative to some datum point or origin. Firstly, the controller 116 causes the carrier 112 to move the probe 114 to a nominal location of a first hole 124, as indicated by CAD data, for example. In this embodiment, the first hole 124 is in a corner of the template 104.

Due to tolerances inherent to the automated manipulator 102 and/or the template 104, for example, the actual location of the first hole 124 may vary from the nominal location of the first hole 124. Nevertheless, the automated manipulator 102 learns the actual location of the first hole 124 when starting from the nominal location. The automated manipulator 102 may do this by measuring the surface around the first hole 124 before automatically finding the first hole 124, entering the first hole 124 and measuring a perimeter of the first hole 124 at a fixed depth of the first hole 124, for example anything up to the thickness of the template 104 (such as 65 mm). The controller 116 is programmed to cause the carrier 112 to move the probe 114 automatically as required to find the first hole 124 and take the necessary measurements.

Using information from the probe 114, the controller determines coordinate data associated with the first hole 124, such as a direction of the first hole 124 (for example, a direction of a central axis of the first hole 124, although that may be taken from the orientation of the template 104 as a whole), a location of a center of the first hole 124, and/or a diameter of the first hole 124. Thus, the controller 116 can cause the carrier 112 to approach a position associated with the first hole 124 (and to do the same for each subsequent hole 126). The automated manipulator 102 repeats the process of learning an actual location of each subsequent hole 126 in the reference hole pattern 122 in a similar manner.

In embodiments, prior to commencing any machining of the workpiece 108, the controller 116 first analyzes the coordinate data associated with the one or more template holes 124, 126, so-called reference features, using a machine learning algorithm/agent. The machine learning agent comprises any suitable model such as tree-based ensemble methods, neural networks, or deep learning methods, for example. In embodiments, the controller comprises the machine learning agent, whereas in other embodiments the machine learning agent may be executed on a remote server, under instruction from the controller. The machine learning agent is trained to provide, as an output, an estimate of machining coordinate deviation based on the coordinate data collected by the probe 114. Machining coordinate deviation should be understood to mean the discrepancy between nominal machining coordinates (e.g. nominal X and Y cartesian coordinates) and actual machining coordinates. Discrepancies can arise due to drifts in calibration, influenced by factors such as temperature or variations within the components of the automated manipulator 102 and/or the fixture 106, for example. If the coordinate deviation predicted by the machine learning agent is below threshold (i.e. sufficiently small), the process of machining the workpiece 108 is allowed to proceed. On the other hand, if the coordinate deviation predicated by the machine learning agent is above threshold (i.e. too large), the process of machining the workpiece 108 is not allowed to proceed.

As an example, assuming the workpiece 108 has a substantially planar machining face in the X, Y plane, a tolerance of +/−0.010 mm in X and Y axes may be stipulated for a given machining process. If the machine learning agent estimates the coordinate deviation in the X axis to be +0.008 mm and the coordinate deviation in the Y axis to be −0.005 mm, the machining process is allowed to proceed—since the (magnitude of the) machining coordinate deviation is below the threshold coordinate deviation. On the other hand, if the machine learning agent estimates the coordinate deviation in the X axis to be +0.012 mm and the coordinate deviation in the Y axis to be −0.017 mm, the machining process is not allowed to proceed. It should be appreciated that different tolerances/thresholds may be permitted for the X, Y and Z axes and the term "machining coordinate deviation" as used herein refers to the deviations in one or more of the X, Y and Z axes.

If the process of machining the workpiece 108 is allowed to proceed, the automated manipulator 102 is arranged in the machining configuration such that the drill 120 is operable to machine the workpiece 108. Also, the template 104 is unmounted from the fixture 106 and the workpiece 108 is mounted on the fixture 106 in place of the template 104. Once the workpiece 108 is in position on the fixture and the automated manipulator 102 is in the machining configuration, the controller 116 causes the carrier 112 to move to the location of the workpiece 108 for drilling the first hole 124'. The carrier 112 is thus put in the same position associated with the first hole 124 of the template 104 based on the determined coordinates of the hole center of the first hole 124 of the template 104. This enables the automated manipulator 102 to replay the position of the carrier 112 to utilize the repeatability of the mechanical workings of the automated manipulator 102. Once the carrier 112 is in position, the controller 116 causes the drill 120 to be operated to drill a hole 124' in the workpiece 108. Once drilled, the first hole 124 of the template 104 is effectively transferred to the workpiece 108. The automated manipulator 102 repeats these steps for each of the multiplicity of holes 124, 126 of the reference hole pattern 122 to produce the matching hole pattern 128 in the workpiece 108.

If the process of machining the workpiece 108 is not allowed to proceed, i.e. because the coordinate deviation predicated by the machine learning agent is above threshold, rather than proceeding to machine the workpiece 108, the controller 116 provides some form of alert to an operator of the machining system 100. The alert could include a hypothesis of a cause for the coordinate deviation falling outside of acceptable limits. This then prompts the operator to investigate potential causes and apply corrective procedures to bring the machining system back within tolerance.

Aside from the probe 114, in embodiments one or more additional sensors 130, 132 are provided, placed in and around the automated manipulator 102 and/or the fixture 106, for example. These may include temperature sensors and/or force sensors. The sensors 130, 132 are in communication with the controller 116, such that readings from the sensors 130, 132 can be fed to the machine learning agent, alongside the coordinate data obtained by probing the template 104. In such embodiments, the machine learning agent is trained to provide an estimate of the machining coordinate deviation further on the basis of the sensor readings.

In some embodiments, the memory 118 stores historical operational data associated with the machining system. This may include data such as historical temperature data from a temperature sensor 130, 132; historical force data from a force sensor 130, 132; and historical coordinate data obtained from previous probing of template 104 by the position probe 114. The controller 116 reads the historical operational data from the memory 116 and feeds it to the machine learning agent, alongside current/real-time data, such as current probing data received from probe 114 probing the template 104 and current temperature data received from one of the sensors 130, 132. In such embodiments, the machine learning agent is trained to provide an estimate of the machining coordinate deviation further on the basis of the historical data.

In embodiments, the machining system includes a coordinate measurement machine (CMM) 140. The CMM may be contact (e.g. based on capacitive proving) or non-contact (e.g. based on optical measurement techniques). The CMM 140 is typically used to validate a workpiece 108 once it has been machined by the automated manipulator 102. It should be appreciated that not every single workpiece 108 is necessarily validated. For example, every second or tenth workpiece 108 may be sent for validation by the CMM 140. Using the CMM 140, the features 124', 128 machined by the automated manipulator 102 in the workpiece 108 can be measured and these measured positions can be compared with nominal positions, such as those defined by the template 104, for example. Ideally, the measured positions would correspond exactly to the nominal positions, but in practice there are likely to be small offsets. These measured offsets can be fed back to the machine learning agent in order to supplement the training of the machine learning agent, thereby improving its ability to make future estimations of machining coordinate deviation.

Figures 2, 3:
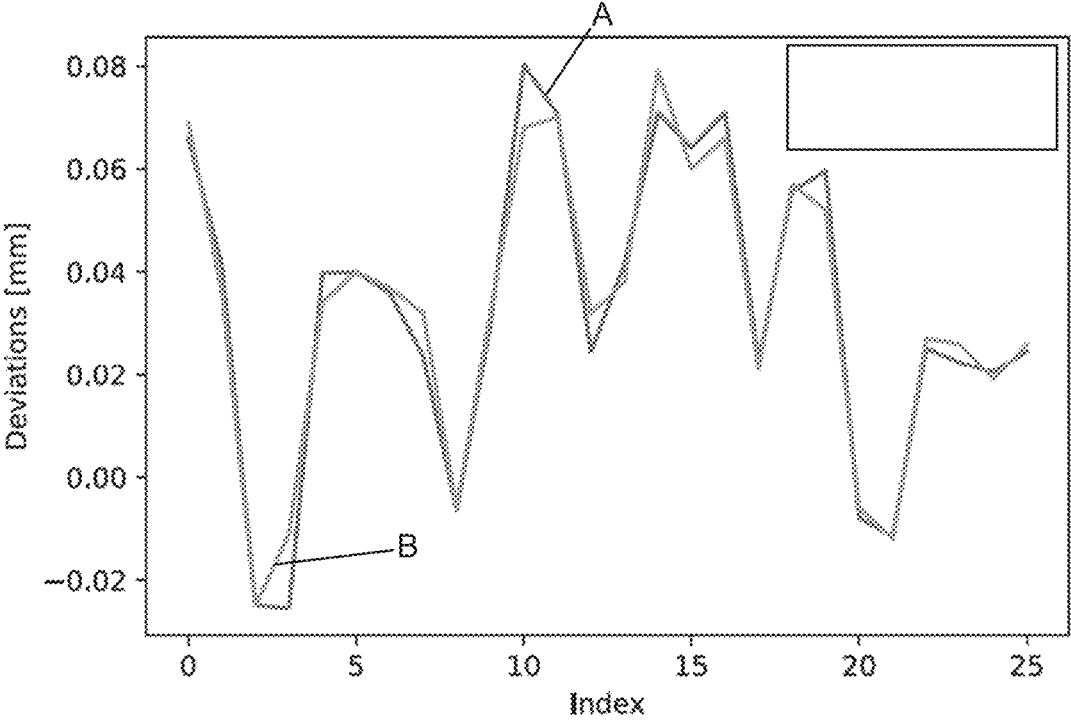
FIG. 2 shows comparison of estimated and measured X axis coordinate deviation.
FIG. 3 is a flow diagram illustrating a method of machining according to embodiments of the disclosure herein.

With reference to FIG. 2, in order to assess the validity of the estimated/predicted coordinate deviation provided by the machine learning agent, an experiment was conducted. In this experiment, a machined workpiece 108 was analyzed with the CMM 140 to determine the true coordinate deviation of each machined feature (index 0 to 25) with respect to nominal. The dark grey line in FIG. 2 (labelled "A") corresponds to X axis deviation (in mm) of each feature as predicted by the machine learning agent. The light grey line in FIG. 2 (labelled "B") corresponds to the true X axis deviation of each feature as obtained through measurement of the workpiece 108 by the CMM 140. As can be seen, the predicted and measured deviations are closely aligned, with deviations within acceptable tolerance.

FIG. 3 shows a method of 300 of machining according to embodiments of the disclosure. The method 300 comprises causing 301 an automated manipulator 102 of a machining system 100, in a measuring configuration, to move a position probe 114 to at least one reference feature 124, 126 of a template 104 held in a fixture 106 of the machining system 100. The method 300 comprises determining 302, with the position probe 114, coordinate data associated with the at least one reference feature 124, 126. The method 300 comprises providing 303 the determined coordinate data to a machine learning agent, the machine learning agent being trained to provide an estimate of machining coordinate deviation based on the determined coordinate data. The method 300 comprises in response 304 to the estimated coordinate deviation being below a threshold coordinate deviation, causing the automated manipulator 102 to proceed in a machining configuration in which a tool 120 is operable to machine a workpiece 108.

Figure 4:
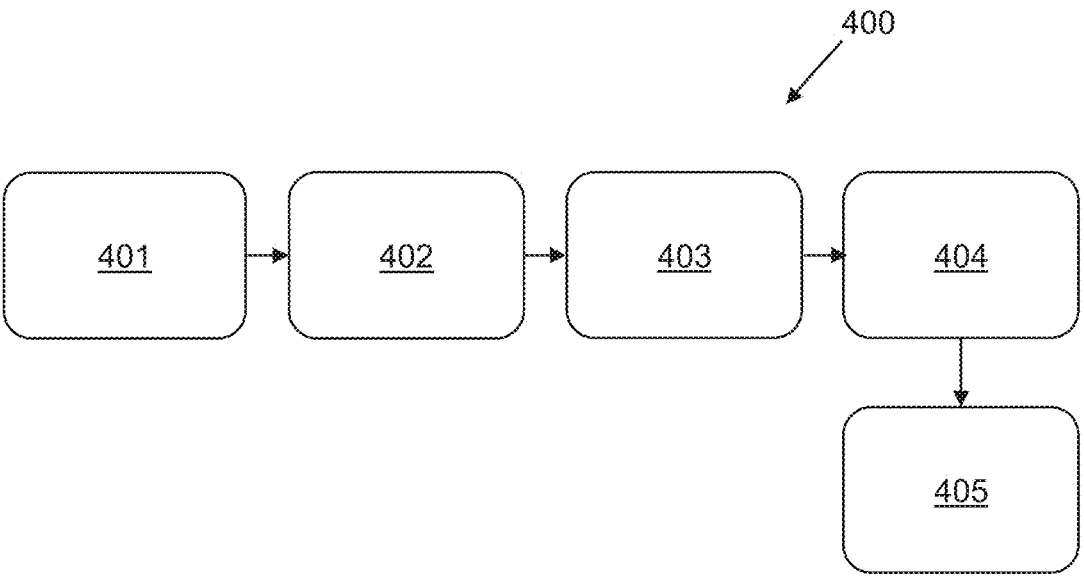
FIG. 4 is a flow diagram illustrating a method of training a machine learning agent for estimating a machining accuracy of a machining process according to embodiments of the disclosure herein.

FIG. 4 shows a method 400 of training a machine learning agent for estimating a machining accuracy of a machining process according to embodiments of the disclosure. The method 400 comprises causing 401 an automated manipulator 102 of a machining system 100, in a measuring configuration, to move a position probe 114 to at least one reference feature 124, 126 of a template held 104 in a fixture 106 of the machining system 100. The method 400 comprises determining 402, with the position probe 114, coordinate data associated with the at least one reference feature 124, 126. The method 400 comprises causing 403 the automated manipulator 102, in a machining configuration and on the basis of the determined coordinate data, to return to the position of the at least one reference feature 124, 126 and machine, using a tool 120, a workpiece 108 held in the fixture 106. The method 400 comprises measuring 404 the position of the or each feature 124' of the workpiece 108 machined by the automated manipulator 102. The method 400 comprises comparing 405 the measured positions of the or each machined feature 124' with respective nominal positions defined by the template 104. The method 400 comprises updating 406 the training of the machine learning agent on the basis of the comparison.

Figure 5:
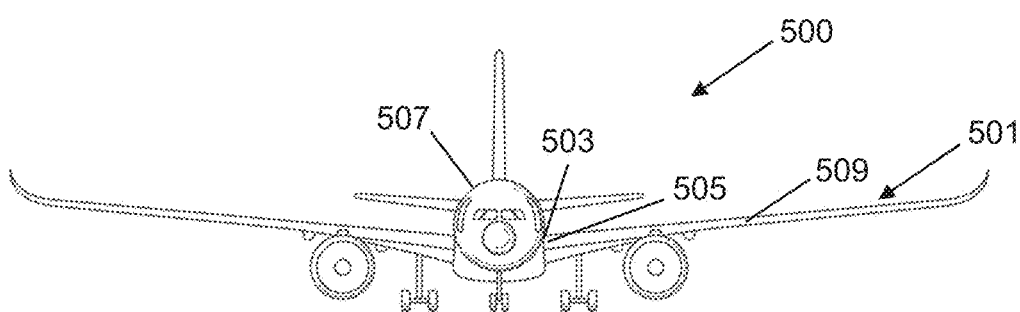
FIG. 5 is an illustration of an aircraft according to embodiments of the disclosure herein.

FIG. 5 shows an aircraft 500 according to embodiments of the disclosure. The aircraft 500 comprises a wing 501, a location 503 of a central wingbox (CWB), a location 509 of an outer wingbox (OWB) and a location 505 of a root end interface between the CWB and the OWB, and a fuselage 507. The CWB is part of the fuselage 507 and the OWB 505 is part of the wing 501. The wing 501 is fixed to the fuselage 507 by coupling the CWB and the OWB at the root end interface. Thus, each of the OWB and the CWB are examples of a wing structure. All or parts of the wing structure may be manufactured using embodiments of machining systems disclosed herein and/or according to methods of machining disclosed herein.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

The methods as described above may each be comprised in or implemented in apparatus comprising a processor or processing system. The processing system may comprise one or more processors and/or memory. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above-described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

While at least one example embodiment of the invention (s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A machining system comprising:

an automated manipulator configurable between a measuring configuration, in which a position probe is operable, and a machining configuration, in which a tool is operable;

a fixture configured for alternately holding a template and a workpiece; and a controller configured to:

when the template is held in the fixture, cause the automated manipulator, in the measuring configuration, to move the position probe to at least one reference feature of the template to determine coordinate data associated with the at least one reference feature;

provide the determined coordinate data to a machine learning agent, which is trained to provide an estimate of machining coordinate deviation based on the determined coordinate data, wherein the estimate of machining coordinate deviation is a prediction of a discrepancy between coordinate data associated with the at least one reference feature of the template and corresponding coordinate data associated with a workpiece once machined in accordance with the template; and when the estimated coordinate deviation is below a threshold coordinate deviation, cause the automated manipulator to proceed in the machining configuration.

2. The machining system of claim 1, wherein, when the workpiece is held in the fixture and the automated manipulator is in the machining configuration, the controller is configured to, based on the determined coordinate data, cause the automated manipulator to return to a position of the at least one reference feature and machine, using the tool, the workpiece held in the fixture.

3. The machining system of claim 2, further comprising a coordinate measurement machine (CMM), wherein the controller is further configured, after the workpiece is machined, to:
cause the CMM to measure a position of one or more machined features of the workpiece machined by the automated manipulator;
compare the position of each of the one or more machined features measured by the CMM with respective nominal positions defined by the template; and
based on the comparison, update the training of the machine learning agent.

4. The machining system of claim 1, wherein, in response to the estimated coordinate deviation being above the threshold coordinate deviation, the controller is configured to stop the automated manipulator from proceeding in the machining configuration.

5. The machining system of claim 4, wherein, when the estimated coordinate deviation is above the threshold coordinate deviation, the controller is further configured to provide an alert to an operator of the machining system that the estimated coordinate deviation is above the threshold coordinate deviation.

6. The machining system of claim 5, wherein the alert comprises an indication of a hypothesis of a cause for the estimated coordinate deviation being above the threshold coordinate deviation.

7. The machining system of claim 1, further comprising at least one sensor configured to sense a parameter of the machining system, wherein the controller is further configured to:
read a parameter value from the at least one sensor; and
provide the parameter value to the machine learning agent, which is trained to provide the estimate of the machining coordinate deviation further based on the parameter value.

8. The machining system of claim 7, wherein:
the at least one sensor comprises a temperature sensor; and
the parameter comprises a temperature of the machining system.

9. The machining system of claim 7, wherein:
the at least one sensor comprises a force sensor; and
the parameter comprises a force present within the machining system.

10. The machining system of claim 1, further comprising a memory for storing historical operational data associated with the machining system, wherein the controller is further configured to:
read the historical operational data from the memory; and
provide the historical operational data to the machine learning agent, which is trained to provide the estimate of the machining coordinate deviation further based on the historical operational data.

11. The machining system of claim 10, wherein the historical operational data comprise one or more of:

historical temperature data;
historical force data; and
historical coordinate data associated with the at least one reference feature.

12. The machining system of claim 1, wherein the automated manipulator comprises a parallel kinematic machine (PKM).

13. An aircraft comprising an aircraft structure machined by the machining system of claim 1.

14. The aircraft according to claim 13, wherein the aircraft structure comprises all of a wing structure or a component part of the wing structure.

15. A method of machining, the method comprising:
holding a template in a fixture of a machining system;
setting an automated manipulator of the machining system in a measuring configuration;
causing the automated manipulator, when in the measuring configuration, to move a position probe to at least one reference feature of the template held in the fixture;
determining, with the position probe, coordinate data associated with the at least one reference feature;
providing the determined coordinate data to a machine learning agent, which is trained to provide an estimate of machining coordinate deviation based on the determined coordinate data, wherein the estimate of machining coordinate deviation is a prediction of a discrepancy between coordinate data associated with the at least one reference feature of the template and corresponding coordinate data associated with a workpiece once machined in accordance with the template; and
when the estimated coordinate deviation is below a threshold coordinate deviation, causing the automated manipulator to proceed in a machining configuration, in which a tool is operable to machine the workpiece when held in the fixture.

16. The method of claim 15, further comprising, when the workpiece is held in the fixture, when the automated manipulator is in the machining configuration, and based on the determined coordinate data, causing the automated manipulator to return to a position of the at least one reference feature and machine, using the tool, the workpiece held in the fixture.

17. The method of claim 16, further comprising:
causing a coordinate measurement machine (CMM) to measure a position of one or more machined features of the workpiece machined by the automated manipulator;
comparing the position of each of the one or more machined features measured by the CMM with respective nominal positions defined by the template; and
updating the machine learning agent based on the comparison.

18. A computer program comprising a set of instructions, which, when the computer program is executed by a computer, cause the computer to carry out the method of claim 16.

19. A method of training a machine learning agent for estimating a machining accuracy of a machining process, the method comprising:
holding a template in a fixture of a machining system;
setting an automated manipulator of the machining system in a measuring configuration;
causing the automated manipulator, when in the measuring configuration, to move a position probe to at least one reference feature of the template held in the fixture;
determining, with the position probe, coordinate data associated with the at least one reference feature;

setting the automated manipulator in a machining configuration;

holding a workpiece in the fixture;

causing the automated manipulator, when in the machining configuration, when the workpiece is held in the fixture, and based on the determined coordinate data, to return to a position of the at least one reference feature and machine, using a tool, the workpiece held in the fixture;

measuring a position of one or more machined features of the workpiece machined by the automated manipulator;

comparing the position of each of the one or more machined features with respective nominal positions defined by the template; and updating the machine learning agent based on the comparison;

wherein the machine learning agent is configured to predict a machining accuracy of a future machining process to be performed on a future workpiece in accordance with the template based on coordinate data associated with the at least one reference feature of the template.

20. A machining system comprising:

an automated manipulator comprising a tool;

14 a position probe;

a sensor configured to sense a parameter of the machining system; and a controller configured to:

receive at least one of position data from the position probe and parameter data from the sensor;

provide the received data to a machine learning algorithm, which is trained to provide an estimate of machining coordinate deviation based on the received data, wherein the estimate of machining coordinate deviation is a prediction of a discrepancy between nominal coordinates on a template and actual machining coordinates on a workpiece; and when the estimated coordinate deviation is below a threshold coordinate deviation, cause the automated manipulator to process the workpiece using the tool.

21. The machining system of claim 20, wherein in response to the estimated coordinate deviation being above the threshold coordinate deviation, the controller does not cause the automated manipulator to process the workpiece using the tool.

22. The machining system of claim 20, wherein the sensor comprises a temperature sensor and/or a force sensor.

* * * * *